United States Patent
Duvaut et al.

(10) Patent No.: US 7,496,135 B2
(45) Date of Patent: *Feb. 24, 2009

(54) SYSTEM AND METHOD FOR SELECTABLE MASK FOR LDSL

(75) Inventors: Patrick Duvaut, Tinton Falls, NJ (US); Ehud Langberg, Wayside, NJ (US)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/849,618

(22) Filed: Sep. 4, 2007

(65) Prior Publication Data

US 2008/0080601 A1    Apr. 3, 2008

Related U.S. Application Data

(63) Continuation of application No. 10/714,907, filed on Nov. 18, 2003, now Pat. No. 7,272,172.

(60) Provisional application No. 60/441,351, filed on Jan. 22, 2003, provisional application No. 60/426,796, filed on Nov. 18, 2002.

(51) Int. Cl.
 *H04B 1/38* (2006.01)
(52) U.S. Cl. .................. 375/222; 375/224; 370/352
(58) Field of Classification Search .......... 375/222, 375/224; 370/352
See application file for complete search history.

(56) References Cited

U.S. PATENT DOCUMENTS

| 6,333,920 | B1 | 12/2001 | Nguyen et al. |
| 7,272,172 | B2 * | 9/2007 | Duvaut et al. ............... 375/222 |
| 2003/0198217 | A1 * | 10/2003 | Redfern ..................... 370/352 |
| 2004/0202239 | A1 * | 10/2004 | Duvaut et al. ............... 375/222 |
| 2004/0202240 | A1 * | 10/2004 | Duvuat et al. ............... 375/222 |
| 2004/0202241 | A1 * | 10/2004 | Duvaut et al. ............... 375/222 |
| 2004/0218667 | A1 * | 11/2004 | Duvaut et al. ............... 375/224 |

OTHER PUBLICATIONS

Ginis et al., "Vectored Transmission for Digital Subscriber Line Systems," IEEE Journal on Selected Areas in Communications, vol. 20, No. 5, Jun. 2002, pp. 1085-1104.*
International Search Report dated May 21, 2004 for Application No. PCT/US03/36843.
Topics in Broadband Access, IEEE Communications Magazine, Oct. 2002, pp. 101-109.
Feng Ouyang et al., the first step of long-reach adsl:smart dsl technology, readsl, Topics in Broadband Acess, IEEE Communications Magazine, Sep. 2003, pp. 124-131.

* cited by examiner

*Primary Examiner*—Sudhanshu C Pathak
(74) *Attorney, Agent, or Firm*—Thomas, Kayden, Horstmeyer & Risley, LLP (57) ABSTRACT

The present invention overcomes various problems by defining two upstream masks (U1, U2) and two downstream masks (D1, D2) and using a mask selectable system for the long reach digital subscriber line (LDSL), in which a unique modem feature is activated during handshake to automatically check for physical layer status in terms of spectral compatibility and, thus, automatically optimize the boosted mode with the use of the mask selectable system choose the best combination of upstream/downstream masks in any physical layer noise scenario.

9 Claims, 3 Drawing Sheets

Figure 1: U1 and D1 PSD Nominal Templates.

Figure 2: U2 and D2 PSD Templates, average values.

FIG. 3

SYSTEM AND METHOD FOR SELECTABLE MASK FOR LDSL

RELATED APPLICATIONS

The present invention is a continuation of U.S. application Ser. No. 10/714,907, filed Nov. 18, 2003, now U.S. Pat. No. 7,272,172, which claims priority to U.S. Provisional Application Nos. 60/441,351 filed Jan. 22, 2003 and 60/426,796 filed Nov. 18, 2002, all of which are incorporated herein by reference in their entirety.

This application is related to copending U.S. patent applications titled "ENHANCED SMART DSL FOR LDSL,", "ENHANCED SMART DSL FOR LDSL," which claim priority to U.S. Provisional Application No. 60/488,804 filed Jul. 22, 2003 and "POWER SPECTRAL DENSITY MASKS FOR IMPROVED SPECTRAL COMPATIBILITY" which claims priority to U.S. Provisional Application No. 60/491,268 filed Jul. 31, 2003, all filed concurrently herewith.

BACKGROUND OF THE INVENTION

The present invention relates generally to electronic communication systems, and in particular, to systems and methods for transmitting and receiving information from such systems over a computer network.

With the increasing popularity of the Internet and other content-heavy electronic communication systems, there has been a substantial need for reliable and affordable high bandwidth mediums for facilitating data transmissions between service providers and their customers. In relation to the requirement that such mediums be affordable to consumers, it was determined that the most cost-effective manner for providing service to customers was by using infrastructure already present in most locations. Accordingly, over recent years, the two such mediums most widely meeting these requirements include the cable television (CATV) and the conventional copper wire telephone systems (plain old telephone system or POTS).

Relating specifically to the adaptation of POTS telephone lines to carry data at high bandwidth or 'broadband' data rates, a number of Digital Subscriber Line (DSL) standards and protocols have been proposed. DSL essentially operates by formatting signals using various Time Domain Equalization techniques to send packets over copper wire at high data rates. A substandard of conventional DSL is known as Asymmetric Digital Subscriber Line (ADSL) and is considered advantageous for its ability to provide very high data rates in the downstream (i.e., from service provider to the user) direction by sacrificing speed in the upstream direction. Consequently, end user costs are minimized by providing higher speeds in the most commonly used direction. Further, ADSL provides a system that applies signals over a single twisted-wire pair that simultaneously supports (POTS) service as well as high-speed duplex (simultaneous two-way) digital data services.

Two of the proposed standards for ADSL are set forth by the International Telecommunications Union, Telecommunication Standardization Section (ITU-T). A first, conventional, ADSL standard is described in ITU-T Recommendation G.992.1—"Asymmetric Digital Subscriber Line (ADSL) Transceivers". A second, G.992.3, ADSL2 is a new standard recently completed and approved by the International Telecommunications Union (ITU) in 2002 that will supersede existing ADSL standards. Work being done under the headings of "G.dmt.bis" and "G.lite.bis" is nearing completion to designate G.992.3 and G.992.4 for full-rate ADSL and splitterless ADSL, respectively. Much has been learned over the past three years of ADSL deployments, including areas where improvements in the technology would be particularly valuable. There is a wide variety of improvements included in ADSL2, each with very different implications; some make the transceivers operate more efficiently, some make them more affordable, and some add functionality.

As briefly described above, all DSL system operate in essentially the following manner. Initial digital data to be transmitted over the network is formed into a plurality of multiplexed data frames and encoded using special digital modems into analog signals which may be transmitted over conventional copper wires at data rates significantly higher than voice band traffic (e.g., ~1.5 Mbps (megabits per second) for downstream traffic, ~150 kbps (kilobits per second) for upstream traffic). The length and characteristics of wire run from a customer's remote transceiver to a central office transceiver may vary greatly from user to user and, consequently, the possible data rates for each user also vary. In addition, the physical channel (i.e., the wires themselves) over which the system communicates also vary over time due to, for example, temperature and humidity changes, fluctuating cross-talk interference sources. The distribution of signal energy over frequency is known as the power spectral density (PSD). Power spectral density is simply the average noise power unit of bandwidth (i.e. dBm/Hz). All transmission systems have a finite power and bandwidth and, therefore, the power and bandwidth of each system is used in a manner so as not to disturb other adjoining systems. A PSD mask is used which is defined as the maximum allowable PSD for a service in presence of any interference combination. The transmit spectrum for a service refers to the PSD of the transmitted signal. Spectral compatibility of the system using a modem boosted modes for improved modem rates and extended reach solutions into existing services may either be without distance limitations or partially limited distance when the spectral compatibility impact is higher than the existing service disturbance beyond a specific reach. The choice between limited and unlimited distance boosted modes are done at the network management level which requires a costly procedure from the telephone company (Telco) to provide physical layer information that also covers how the existing services are deployed, and because of the costs involved, broadband services providers shy away from all the boosted mode solutions, specially the limited distance boosted modes, thereby, restraining the coverage and performance of the underlying service deployment.

SUMMARY OF THE INVENTION

The present invention relates generally to the field of telecommunications and, more particularly, to data communications over telephone networks and more specifically the invention addresses some of the fundamental issues in coping with the performance objectives for LDSL (Long reach digital subscriber Line) systems which is sometimes called last mile DSL.

The present invention overcomes all of the aforementioned problems by defining two upstream masks (U1, U2) and two downstream masks (D1, D2) and using a mask selectable system for the long reach digital subscriber line (LDSL), in which a unique modem feature is activated during handshake to automatically check for physical layer status in terms of spectral compatibility and, thus, automatically optimize the boosted mode with the use of the mask selectable system choose the best combination of upstream/downstream masks in any physical layer noise scenario.

Crosstalk noise environments are varied, which include NEXT and FEXT disturbance from ISDN, HDSL, SHDSL, T1, and Self-disturbers at both the CO and CPE ends. NEXT from HDSL and SHDSL tend to limit the performance in the upstream channel while NEXT from T1 systems tend to severely limit the downstream channel performance. Also, loops containing bridged taps will degrade performance on the ADSL downstream channel more so than the upstream channel. It appears almost impossible that only one single pair of Upstream and Downstream masks will maximize the performance against any noise-loop field scenario, while ensuring spectral compatibility and at the same time, keeping a desirable balance between Upstream and Downstream rates. A realistic approach for LDSL relies on different Upstream and Downstream masks exhibiting complementary features. Realistically, all these chosen masks are available on any LDSL Platform. At the modem start up, based on a certain protocol, the best Upstream-Downstream pair of masks are automatically chosen. Whether the best pair is manually chosen is at the discretion of the operator, or it is automatically selected, this concept is identified as "smart DSL for LDSL".

It is emphasized that other rationales advocate for smart DSL: The use of a single mask may prevent to provide some areas in the US dominated by T1 noise for instance; A spectrally compatible mask can't be ruled out; One can't prevent service providers to have access to an array of mask/tools provided as long as they are spectrally compatible; Service providers may decide to use only one mask according to the physical layer conditions, or any combination for the same reasons. The present invention defines two upstream masks (U1, U2) and two downstream masks (D1, D2) and using a mask selectable system as well as a tunable mask system for the long reach digital subscriber line (LDSL), in which a unique modem feature is activated during handshake to automatically check for physical layer status in terms of spectral compatibility and, thus, automatically optimize the boosted mode with the use of the mask selectable system choose the best combination of upstream/downstream masks in any physical layer noise scenario.

DETAILED DESCRIPTION OF THE PREFERRED EMBODIMENTS

The performance of a "single mask" system and a "selectable mask" system for long reach DSL (LDSL) according to the agreements described in T1E1.4/2002-292R2 define eight different noise cases and 10 different loops, for a total of 80 test scenarios. The objective minimum bit rates for LDSL systems are 192 kb/s downstream and 96 kb/s upstream in each of the 80 test scenarios. We find a significant performance advantage for the selectable mask system in a number of test cases.

The "single Mask system" uses a single upstream and a single downstream mask, based on 0J-074, and are respectively referred to as U2 and D2 herein. This is a non-overlapped PSD scenario where the upstream channel ends at tone 23 and the downstream begins at tone 33. The "mask-selectable system" uses two upstream masks, U1 and U2, and two downstream masks, D1 and D2. Upstream mask U1 ends at tone 13 and the downstream mask, D1, is a shaped overlap mask derived from spectrum management class 5 in T1.417. The "mask-selectable system" selects the best Upstream and Downstream mask combination for each test case according to some criteria. Optimality criterion is left to the discretion of the operator who may want to force a mask set up according to the operator's field knowledge, or give priority to Upstream minimum rate, or Downstream minimum rate, up to certain margin, etc. This degree of freedom is a keystone of the selectable mask system. In the same spirit, ADSL overlap mode is left today to the discretion of the operator. Neither G.992.1 nor G.992.3 define criteria to select overlap mode. In actual deployment, the mask selection may be performed at initialization based on loop and noise conditions and criteria determined by operators and vendors.

Simulation results show that a mask-selectable system offers significant advantages over the single mask system under certain channel and noise conditions. Specifically, the single mask system (U2, D2} is judged subjectively "best" on approximately 60% of the test cases. The selectable mask system meets the data rate objectives for LDSL on approximately 90% of the test scenarios.

Mask-Selectable System for LDSL

Two Upstream masks, U1 and U2, and two downstream masks, D1 and D2, are used in what follows to define a mask-selectable system for LDSL.

In any physical layer noise scenario, the mask-selectable system chooses the best Upstream/Downstream masks combination according to some criteria. It is possible to prove that the four possible US/DS masks combinations defined hereafter are indeed spectrally compatible, according to method B (i.e. Annex A) of T1.417.

Although we show the masks in pairs, we do not place restrictions on mask combinations. Therefore, mask U1 can be used with mask D1 or D2 for example.

Masks U1 and D1

Figure 1:
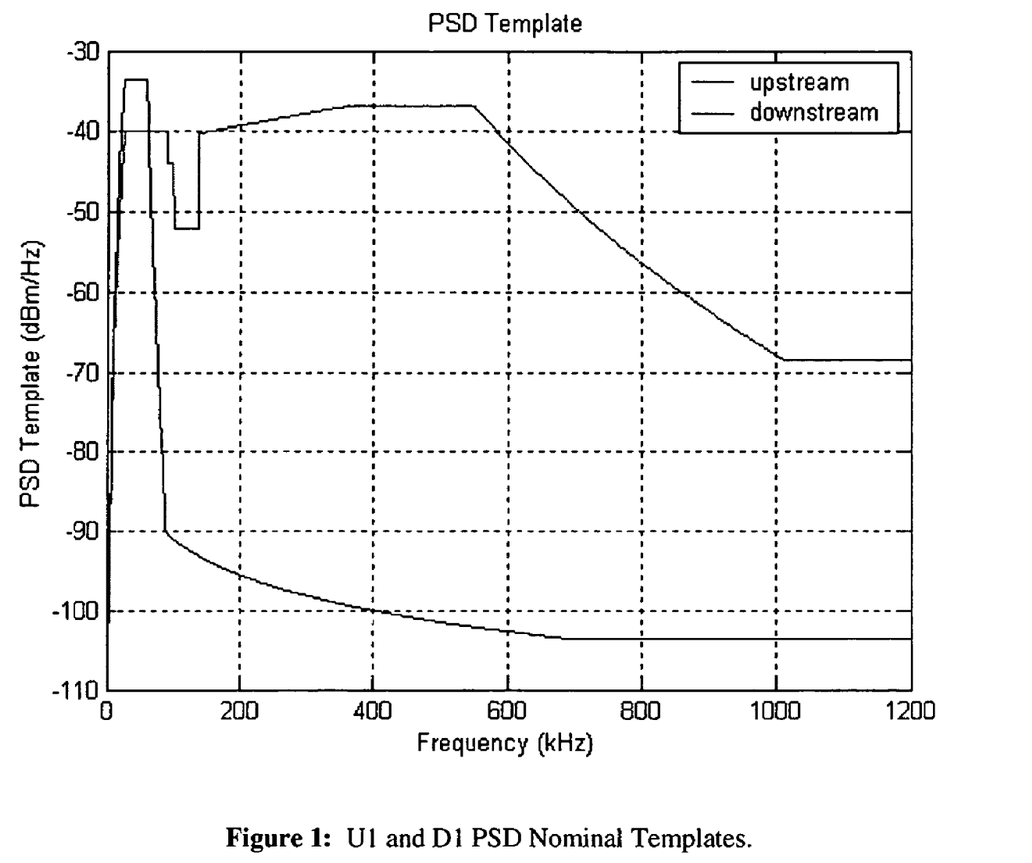
FIG. 1 is a plot of U1 and D1 PSD nominal templates according to embodiments of the invention.
Figure 2:
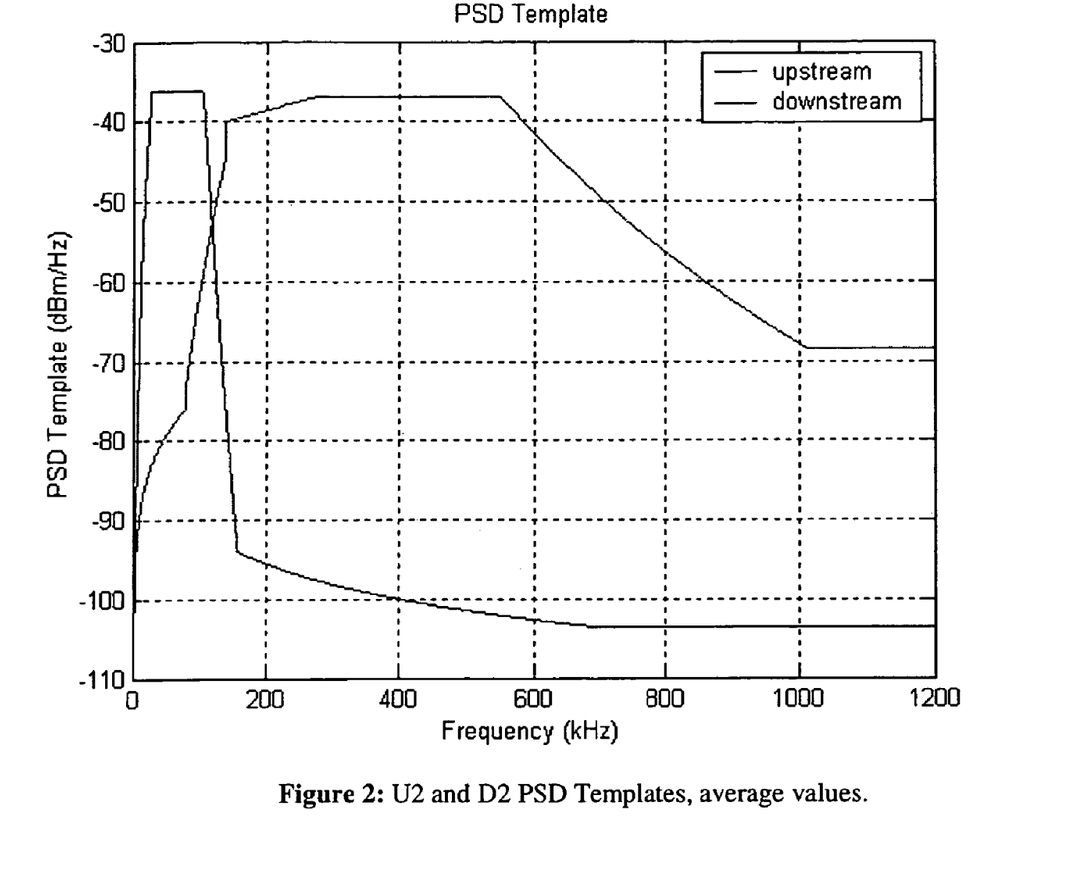
FIG. 2 is an average values plot of U2 and D2 PSD templates according to embodiments of the invention.

U1 and D1 PSD nominal templates are plotted in FIG. 1 and explicitly defined in Tables 1 and 2. As defined by the standards, the PSD templates, or average PSD values, are 3.5 dB lower than the mask values. As shown in FIG. 1, D1 PSD overlaps the ADSL Upstream bandwidth.

TABLE 1

| U1 PSD Nominal Templates | |
|---|---|
| Frequency (kHz) | PDS (dBm/Hz) |
| $0 \leq f < 4$ | $-101.5$ |
| $4 \leq f < 25.875$ | $-96 + 23.4*\log2(f/4)$ |
| $25.875 \leq f < 60.375$ | $-32.9$ |
| $60.375 \leq f < 686$ | max $\{-32.9 - 95 \times \log_2(f/60.38), 10 \times \log10[0.05683 \times (f \times 10^3)^{-1.5}] - 3.5\}$ |
| $686 \leq f < 1411$ | $-103.5$ |
| $1411 \leq f < 1630$ | $-103.5$ peak, $-113.5$ average in any [f, f + 1 MHz] window |
| $1630 \leq f < 12000$ | $-103.5$ peak, $-115.5$ average in any [f, f + 1 MHz] window |

Note 1.
The 95 dB/octave slope will be replaced by the ADSL + standardized roll off.

TABLE 2

D1 PSD Nominal Templates

| Frequency (kHz) | PDS (dBm/Hz) |
|---|---|
| $0 \leq f < 4$ | −101 |
| $4 \leq f < 25.875$ | $-96 + 20.79*\log_2(f/4)$ |
| $25.875 \leq f < 91$ | −40 |
| $91 \leq f < 99.2$ | −44 |
| $99.2 \leq f < 138$ | −52 |
| $138 \leq f < 353.625$ | $-40.2 + 0.0148*(f - 138)$ |
| $353.625 \leq f < 552$ | −37 |
| $552 \leq f < 1012$ | $-37 - 36*\log_2(f/552)$ |
| $1012 \leq f < 1800$ | −68.5 |
| $1800 \leq f < 2290$ | $-68.5 - 75*\log_2(f/1800)$ |
| $2290 \leq f < 3093$ | −93.500 |
| $3093 \leq f < 4545$ | −93.5 peak, average $-40 - 36*\log_2(f/1104)$ in any [f, f + 1 MHz] window |
| $4545 \leq f < 12000$ | −93.5 peak, average −113.500 in any [f, f + 1 MHz] window |

Note 2.
U1 Total power is equal to 12.47 dBm. D1 total power is equal to 19.43 dBm.

Masks U2 and D2

Tables 3 and 4 give the breakpoints of U2 and D2 PSD Nominal Templates. U2 and D2 are derived from OJ-074. To minimize self NEXT due to the side lobes, the low frequency edge of OJ-074 downstream PSD and the high frequency edge of OJ-074 upstream PSD have been sharpened according to ADSL+ recommendations and exhibit 95 dB/octave slope.

TABLE 3

U2 PSD Nominal Template, average values.

| Frequency (kHz) | PDS (dBm/Hz) |
|---|---|
| $0 \leq f < 4$ | −101.5 |
| $4 \leq f < 25.875$ | $-96 + 32.5*\log_2(f/4)$ |
| $25.875 \leq f < 103.5$ | −36.4 |
| $103.5 \leq f < 686$ | max {$-36.3 - 95 \times \log_2(f/103.5)$, $10 \times \log_{10}[0.05683 \times (f \times 10^3)^{-1.5}] - 3.5$} |
| $686 \leq f < 1411$ | −103.5 |

TABLE 3-continued

U2 PSD Nominal Template, average values.

| Frequency (kHz) | PDS (dBm/Hz) |
|---|---|
| $1411 \leq f < 1630$ | −103.5 peak, −113.5 average in any [f, f + 1 MHz] window |
| $1630 \leq f < 12000$ | −103.5 peak, −115.5 average in any [f, f + 1 MHz] window |

Note 3.
The 95 dB/octave slope will be replaced by the ADSL + standardized roll off.

TABLE 4

D2 PSD Nominal Template, average values.

| Frequency (kHz) | PDS (dBm/Hz) |
|---|---|
| $0 \leq f < 4$ | −101.5 |
| $4 \leq f < 80.000$ | $-96 + 4.63*\log_2(f/4)$ |
| $80 \leq f < 138.000$ | $-76 + 36*\log_2(f/80)$ |
| $138 \leq f < 276.000$ | $-42.95 + 0.0214*f$ |
| $276 \leq f < 552.000$ | −37 |
| $552 \leq f < 1012$ | $-37 - 36*\log_2(f/552)$ |
| $1012 \leq f < 1800$ | −68.5 |
| $1800 \leq f < 2290$ | $-68.5 - 75*\log_2(f/1800)$ |
| $2290 \leq f < 3093$ | −93.500 |
| $3093 \leq f < 4545$ | −93.5 peak, average $-40 - 36*\log_2(f/1104)$ in any [f, f + 1 MHz] window |
| $4545 \leq f < 12000$ | −93.5 peak, average −113.500 in any [f, f + 1 MHz] window |

Note 4.
U2 total power is equal to 12.5 dBm. D2 total power is equal to 19.30 dBm.

Performance of Selectable Masks System for LDSL ADSL2 Performance

Table 5 gives the ADSL2 Upstream and downstream performance for calibration purposes. Noise scenarios are numbered from 1 to 8 according to T1.E1.4/292-R2. Numbers shown in bold indicate those that do not meet the LDSL performance objective of 192 kbps downstream and 96 kbps upstream.

TABLE 5

ADSL2 simulation results. Data rates in kbps.

upstream

| | | case 1 Self Nex | case 2 ADSL | case 3 ISDN | case 4 SHDSL | case 5 HDSL | case 6 T1 | case 7 MIX | case 8 TIA |
|---|---|---|---|---|---|---|---|---|---|
| ADSL 2 | xDSL 10 | 963 | 963 | 623 | 344 | 357 | 982 | 597 | 665 |
| | xDLS 11 | 682 | 682 | 340 | 142 | 156 | 692 | 315 | 378 |
| | xDLS 12 | 633 | 633 | 294 | 109 | 122 | 642 | 270 | 331 |
| | xDLS 13 | 470 | 470 | 151 | 58 | 67 | 478 | 123 | 175 |
| | xDLS 160 | 770 | 770 | 424 | 168 | 180 | 786 | 398 | 463 |
| | xDLS 165 | 719 | 719 | 377 | 140 | 150 | 736 | 347 | 415 |
| | xDLS 170 | 668 | 668 | 328 | 115 | 124 | 684 | 299 | 364 |
| | xDLS 175 | 620 | 619 | 283 | 93 | 105 | 634 | 259 | 316 |
| | xDSL 180 | 576 | 576 | 241 | 77 | 88 | 585 | 217 | 275 |
| | xDLS 185 | 531 | 530 | 199 | 63 | 69 | 542 | 179 | 233 | downstream

| | | case 1 Self Nex | case 2 ADSL | case 3 ISDN | case 4 SHDSL | case 5 HDSL | case 6 T1 | case 7 MIXT | case 8 TIA |
|---|---|---|---|---|---|---|---|---|---|
| ADSL 2 | xDSL 10 | 1260 | 1260 | 1168 | 1354 | 1348 | 194 | 1218 | 186 |
| | xDLS 11 | 207 | 207 | 101 | 250 | 250 | 0 | 131 | 0 |
| | xDLS 12 | 418 | 418 | 325 | 462 | 461 | 0 | 365 | 0 |
| | xDLS 13 | 164 | 194 | 148 | 199 | 199 | 0 | 165 | 0 |

TABLE 5-continued

ADSL2 simulation results. Data rates in kbps.

| | | | | | | | | |
|---|---|---|---|---|---|---|---|---|
| xDLS 160 | 979 | 979 | 875 | 1057 | 1051 | 115 | 928 | 113 |
| xDLS 165 | 774 | 774 | 657 | 847 | 844 | 72 | 718 | 66 |
| xDLS 170 | 598 | 598 | 500 | 659 | 658 | 35 | 543 | 29 |
| xDLS 175 | 447 | 471 | 357 | 500 | 500 | 0 | 412 | 8 |
| xDSL 180 | 320 | 352 | 260 | 365 | 365 | 0 | 304 | 0 |
| xDLS 185 | 218 | 248 | 195 | 256 | 256 | 0 | 220 | 0 |

Modified 0J-074 Single mask Performance, Combination (U2, D2)

Table 6 displays the results of the Modified 0J-074 (U2, D2}. These results will be taken as references for LDSL.

TABLE 6

Performance results for the a single upstream and single downstream PSD mask

| | | upstream | | | | | | | |
|---|---|---|---|---|---|---|---|---|---|
| | | case 1 Self Nex | case 2 ADSL | case 3 ISDN | case 4 SHDSL | case 5 HDSL | case 6 T1 | case 7 MIX | case 8 TIA |
| Single Mask (U2, D2) | xDSL 10 | 837 | 838 | 515 | 330 | 345 | 842 | 480 | 531 |
| | xDLS 11 | 663 | 664 | 338 | 170 | 182 | 665 | 303 | 352 |
| | xDLS 12 | 619 | 619 | 295 | 134 | 144 | 620 | 261 | 309 |
| | xDLS 13 | 492 | 492 | 182 | 71 | 82 | 493 | 152 | 193 |
| | xDLS 160 | 705 | 705 | 375 | 201 | 218 | 707 | 340 | 389 |
| | xDLS 165 | 670 | 671 | 341 | 169 | 181 | 673 | 306 | 355 |
| | xDLS 170 | 636 | 636 | 308 | 141 | 151 | 638 | 274 | 322 |
| | xDLS 175 | 602 | 602 | 275 | 116 | 125 | 603 | 242 | 289 |
| | xDSL 180 | 567 | 567 | 244 | 94 | 106 | 569 | 211 | 256 |
| | xDLS 185 | 533 | 532 | 213 | 77 | 88 | 534 | 182 | 225 |

| | | downstream | | | | | | | |
|---|---|---|---|---|---|---|---|---|---|
| | | case 1 Self Nex | case 2 ADSL | case 3 ISDN | case 4 SHDSL | case 5 HDSL | case 6 T1 | case 7 MIXT | case 8 TIA |
| Single Mask (U2, D2) | xDSL 10 | 2402 | 1661 | 1869 | 2048 | 2039 | 467 | 1658 | 240 |
| | xDLS 11 | 991 | 407 | 505 | 872 | 911 | 97 | 380 | 0 |
| | xDLS 12 | 1195 | 643 | 694 | 986 | 1000 | 58 | 578 | 0 |
| | xDLS 13 | 848 | 398 | 489 | 706 | 793 | 63 | 368 | 0 |
| | xDLS 160 | 2049 | 1333 | 1499 | 1772 | 1769 | 365 | 1310 | 171 |
| | xDLS 165 | 1787 | 1086 | 1252 | 1544 | 1556 | 291 | 1063 | 109 |
| | xDLS 170 | 1551 | 879 | 1028 | 1342 | 1366 | 227 | 846 | 63 |
| | xDLS 175 | 1336 | 753 | 819 | 1158 | 1191 | 175 | 684 | 40 |
| | xDSL 180 | 1140 | 633 | 747 | 996 | 1035 | 131 | 604 | 13 |
| | xDLS 185 | 970 | 528 | 665 | 850 | 891 | 94 | 519 | 0 |

Performance of Selectable Masks system

Table 7 gives the results of the selectable masks system for LDSL, based T1E10.4/2002-292R2.

The selectable mask system optimality criteria may be left to the discretion of the operator who may want to force a mask according to deployment guidelines, or give priority to upstream minimum rate, or downstream minimum rate, up to certain margin, etc. This degree of freedom is a keystone of the selectable mask system. In the same spirit, ADSL overlap mode may be left today to the discretion of the operator.

Neither G.992.1 nor G.992.3 define criteria to select overlap mode.

In presenting results for the selectable mask system, we used mask selection criteria that considers both upstream and downstream rates but weighs the downstream more heavily by a 2:1 ratio. We compare all mask combinations and derive a cost function equal to:

$$cost=2*(dsrate(2)-dsrate(1))/dsrate(1)+(usrate(2)-usrate(1))/usrate(1).$$

If the cost is greater than zero, we select mask 2, otherwise we select mask 1. We will always try and select a mask for which neither the upstream nor the downstream rate is 0. If all masks have an upstream or downstream rate of 0 kbps, then the mask with the highest downstream or upstream rate respectively is selected.

The results presented in this section assume that the self crosstalk includes only the PSD masks being evaluated.

TABLE 7

Performance projections for the selectable mask system. Data rates in kbps.

upstream

| | | case 1 Self Nex | case 2 ADSL | case 3 ISDN | case 4 SHDSL | case 5 HDSL | case 6 T1 | case 7 MIX | case 8 TIA |
|---|---|---|---|---|---|---|---|---|---|
| Selec- | xDSL 10 | 837 | 838 | 515 | 330 | 345 | 235 | 480 | 239 |
| table | xDLS 11 | 663 | 664 | 338 | 170 | 153 | 169 | 303 | 173 |
| Masks | xDLS 12 | 619 | 619 | 295 | 148 | 156 | 147 | 261 | 151 |
| | xDLS 13 | 492 | 492 | 182 | 108 | 115 | 106 | 152 | 109 |
| | xDLS 160 | 705 | 705 | 375 | 201 | 218 | 176 | 340 | 181 |
| | xDLS 165 | 670 | 671 | 341 | 169 | 181 | 163 | 306 | 167 |
| | xDLS 170 | 636 | 636 | 308 | 150 | 158 | 149 | 274 | 153 |
| | xDLS 175 | 602 | 602 | 275 | 137 | 145 | 135 | 242 | 139 |
| | xDSL 180 | 567 | 567 | 244 | 124 | 131 | 122 | 211 | 126 |
| | xDLS 185 | 533 | 532 | 213 | 111 | 118 | 110 | 182 | 113 | downstream

| | | case 1 Self Nex | case 2 ADSL | case 3 ISDN | case 4 SHDSL | case 5 HDSL | case 6 T1 | case 7 MIXT | case 8 TIA |
|---|---|---|---|---|---|---|---|---|---|
| Selec- | xDSL 10 | 2402 | 1661 | 1869 | 2048 | 2039 | 1026 | 1658 | 402 |
| table | xDLS 11 | 991 | 407 | 505 | 872 | 1023 | 375 | 380 | 61 |
| Masks | xDLS 12 | 1195 | 643 | 694 | 986 | 1000 | 305 | 578 | 40 |
| | xDLS 13 | 848 | 398 | 489 | 706 | 794 | 173 | 368 | 19 |
| | xDLS 160 | 2049 | 1333 | 1499 | 1772 | 1769 | 726 | 1310 | 232 |
| | xDLS 165 | 1787 | 1086 | 1252 | 1544 | 1556 | 610 | 1063 | 157 |
| | xDLS 170 | 1551 | 879 | 1028 | 1342 | 1366 | 509 | 846 | 99 |
| | xDLS 175 | 1336 | 753 | 819 | 1158 | 1192 | 420 | 684 | 71 |
| | xDSL 180 | 1140 | 633 | 747 | 996 | 1036 | 333 | 604 | 38 |
| | xDLS 185 | 970 | 528 | 665 | 850 | 892 | 255 | 519 | 22 |

TABLE 8

Projected reach Improvement versus ADSL2 in feet on a 26AWG straight loop at the target data rate 192 kbls/96 kb/s.

| PSD mask noise | | single mask | selectable mask | difference |
|---|---|---|---|---|
| s lf | 1C1 | 3300 | 3300 | 0 |
| ADSL | 1C2 | 1800 | 1800 | 0 |
| IDSN | 1C3 | 500 | 500 | 0 |
| SHDSL | 1C4 | 500 | 1600 | 1100 |
| HDSL | 1C5 | 500 | 1600 | 1100 |
| T1 | 1C6 | 1700 | 3500 | 1800 |
| combo | 1C7 | 1100 | 1100 | 0 |
| TIA | 1C8 | 500 | 900 | 400 |

By comparing selectable masks system and single mask it is found that a single mask system cannot handle multiple physical layer/noise scenarios.

Table 9 gives the selected upstream/downstream masks according to the optimality criteria defined in section 3.3. Table 9 illustrates that different PSD masks are appropriate under different channel and noise conditions.

TABLE 9

Selectable masks system for LDSL: Upstream/Downstream Selection Table.

| | case 1 Self Nex | case 2 ADSL | case 3 ISDN | case 4 SHDSL | case 5 HDSL | case 6 T1 | case 7 MIX | case 8 TIA |
|---|---|---|---|---|---|---|---|---|
| xDSL 10 | u2d2 | u2d2` | u2d2 | u2d2 | u2d2 | u1d1 | u2d2 | u1d1 |
| xDLS 11 | u2d2 | u2d2 | u2d2 | u2d2 | u1d1 | u1d1 | u2d2 | u1d1 |
| xDLS 12 | u2d2 | u2d2 | u2d2 | u1d2 | u1d2 | u1d1 | u2d2 | u1d1 |
| xDLS 13 | u2d2 | u2d2 | u2d2 | u1d2 | u1d2 | u1d1 | u2d2 | u1d1 |
| xDLS 160 | u2d2 | u2d2 | u2d2 | u2d2 | u2d2 | u1d1 | u2d2 | u1d1 |
| xDLS 165 | u2d2 | u2d2 | u2d2 | u2d2 | u2d2 | u1d1 | u2d2 | u1d1 |
| xDLS 170 | u2d2 | u2d2 | u2d2 | u1d2 | u1d2 | u1d1 | u2d2 | u1d1 |
| xDLS 175 | u2d2 | u2d2 | u2d2 | u1d2 | u1d2 | u1d1 | u2d2 | u1d1 |
| xDSL 180 | u2d2 | u2d2 | u2d2 | u1d2 | u1d2 | u1d1 | u2d2 | u1d1 |
| xDLS 185 | u2d2 | u2d2 | u2d2 | u1d2 | u1d2 | u1d1 | u2d2 | u1d1 |

Although all mask combinations were considered, only three combinations are required to address multiple physical layer/noise scenarios:

{U1, D1}, identified as the Overlap Combination;
{U2, D2), identified as the FDM Combination;
{U1, D2}, identified as the Hybrid Combination.

The overlap Combination {U1, D1} is essential to handle cases noise # 8 and # 6, where T1 noise seriously limits downstream performance of the FDM combination {U2, D2}.

The hybrid combination {U1, D2} is crucial in the presence of HDSL and SHDSL cross talks to lift the {U2, D2} Upstream performance limitations.

{U2, D2} wins ~60% of the scenarios.
{U1, D1} wins ~25%% of the scenarios.
{U1, D2) wins ~15% of the scenarios.

It has been noted that the including only the self-crosstalk from the PSD mask being tested may be overly optimistic. The reason is that if LDSL includes an overlapped and a non-overlapped mask, for example, that results using the non-overlapped mask will be overly optimistic if some crosstalk from the overlapped mask are not included.

To address this issue, we have also run simulations results assuming that there is always at least one overlapped LDSL disturber using mask D1 in the downstream direction. In the upstream direction, therefore, we assume that the total number of NEXT self-disturbers is one less than the number given in T1E1.4/2002-292R2 and that the remaining self disturber is mask D1. In the downstream direction, similarly, we make the same assumption for FEXT self-disturbers. NEXT disturbers at the CPE and FEXT disturbers at the CO are left unchanged. For the case where the overlapped mask was selected previously there should be no difference in data rates.

and TIA test cases, the upstream rate is affected very little if at all. This is because HDSL and SHDSL disturbance is no friendlier to ADSL upstream than our overlapped PSD mask proposal is. Although SHDSL and HDSL are considered spectrally compatible with ADSL, they do have a significant negative impact on ADSL upstream performance.

Like Annex A, LDSL system operates in both non overlap and overlap modes. It should be pointed out that LDSL systems always meet the 96 kb/s upstream rate objective, against any loop/noise scenario defined in T1E1.4/2002-292R2, even in the presence of one LDSL overlap disturber.

An operator who deploys T1, HDSL, or SHDSL should have no issue deploying overlapped LDSL. However, if a loop bundle if generally free of other disturbers, then it would not make sense to deploy overlapped LDSL. Therefore, the operator should be able to select any subset of LDSL PSD masks.

We note also that even if the overlapped LDSL mask were allowed on loops that are free of SHDSL, HDSL, and T1, any reasonable selection criteria would never choose the overlapped mask. Therefore, the concern over the overlapped mask is not warranted even if the operator does not specifically prohibit it.

The performance of a "single mask" system and a "selectable mask" system for LDSL are shown that a selectable mask system offers considerable data rate or equivalently reach advantage under certain noise and loop conditions. The selectable mask system, with a choice from three upstream/downstream combinations namely (U1, D1), (U2, D2), and (U1, D2), meets the LDSL minimum data rate requirements for approximately 90% of test scenarios.

TABLE 10

Performance results assuming that at least 1 overlap PSD mask is always present. Data rates are in kbps.

|  |  | upstream | | | | | | | |
|---|---|---|---|---|---|---|---|---|---|
|  |  | case 1 Self Nex | case 2 ADSL | case 3 ISDN | case 4 SHDSL | case 5 HDSL | case 6 T1 | case 7 MIX | case 8 TIA |
| Selec- | xDSL 10 | 505 | 505 | 410 | 327 | 341 | 235 | 404 | 239 |
| table | xDSL 11 | 330 | 330 | 238 | 169 | 153 | 169 | 232 | 173 |
| Masks: | xDLS 12 | 289 | 289 | 198 | 147 | 155 | 147 | 193 | 151 |
| 1 | xDLS 13 | 182 | 182 | 98 | 107 | 114 | 106 | 100 | 109 |
| Overlap + | xDLS 160 | 364 | 364 | 271 | 198 | 214 | 176 | 265 | 181 |
| Self | xDLS 165 | 332 | 332 | 240 | 163 | 178 | 163 | 234 | 167 |
|  | xDLS 170 | 300 | 300 | 209 | 149 | 156 | 149 | 203 | 153 |
|  | xDLS 175 | 269 | 269 | 179 | 135 | 143 | 135 | 174 | 139 |
|  | xDSL 180 | 239 | 239 | 152 | 122 | 130 | 122 | 147 | 126 |
|  | xDLS 185 | 208 | 208 | 123 | 110 | 117 | 110 | 119 | 113 |
|  |  | downstream | | | | | | | |
|  |  | case 1 Self Nex | case 2 ADSL | case 3 ISDN | case 4 SHDSL | case 5 HDSL | case 6 T1 | case 7 MIXT | case 8 TIA |
| Selec- | xDSL 10 | 2403 | 1661 | 1869 | 2048 | 2039 | 1026 | 1658 | 402 |
| table | xDSL 11 | 991 | 407 | 505 | 872 | 1023 | 375 | 380 | 61 |
| Masks: | xDLS 12 | 1196 | 643 | 694 | 986 | 1000 | 305 | 578 | 40 |
| 1 | xDLS 13 | 856 | 398 | 489 | 706 | 794 | 173 | 368 | 19 |
| Overlap + | xDLS 160 | 2050 | 1333 | 1499 | 1772 | 1770 | 726 | 1310 | 232 |
| Self | xDLS 165 | 1787 | 1086 | 1252 | 1544 | 1557 | 610 | 1063 | 157 |
|  | xDLS 170 | 1551 | 879 | 1028 | 1342 | 1366 | 509 | 846 | 99 |
|  | xDLS 175 | 1336 | 753 | 819 | 1158 | 1192 | 420 | 684 | 71 |
|  | xDSL 180 | 1140 | 633 | 747 | 996 | 1036 | 333 | 604 | 38 |
|  | xDLS 185 | 970 | 528 | 665 | 850 | 892 | 255 | 519 | 22 |

Figure 3:
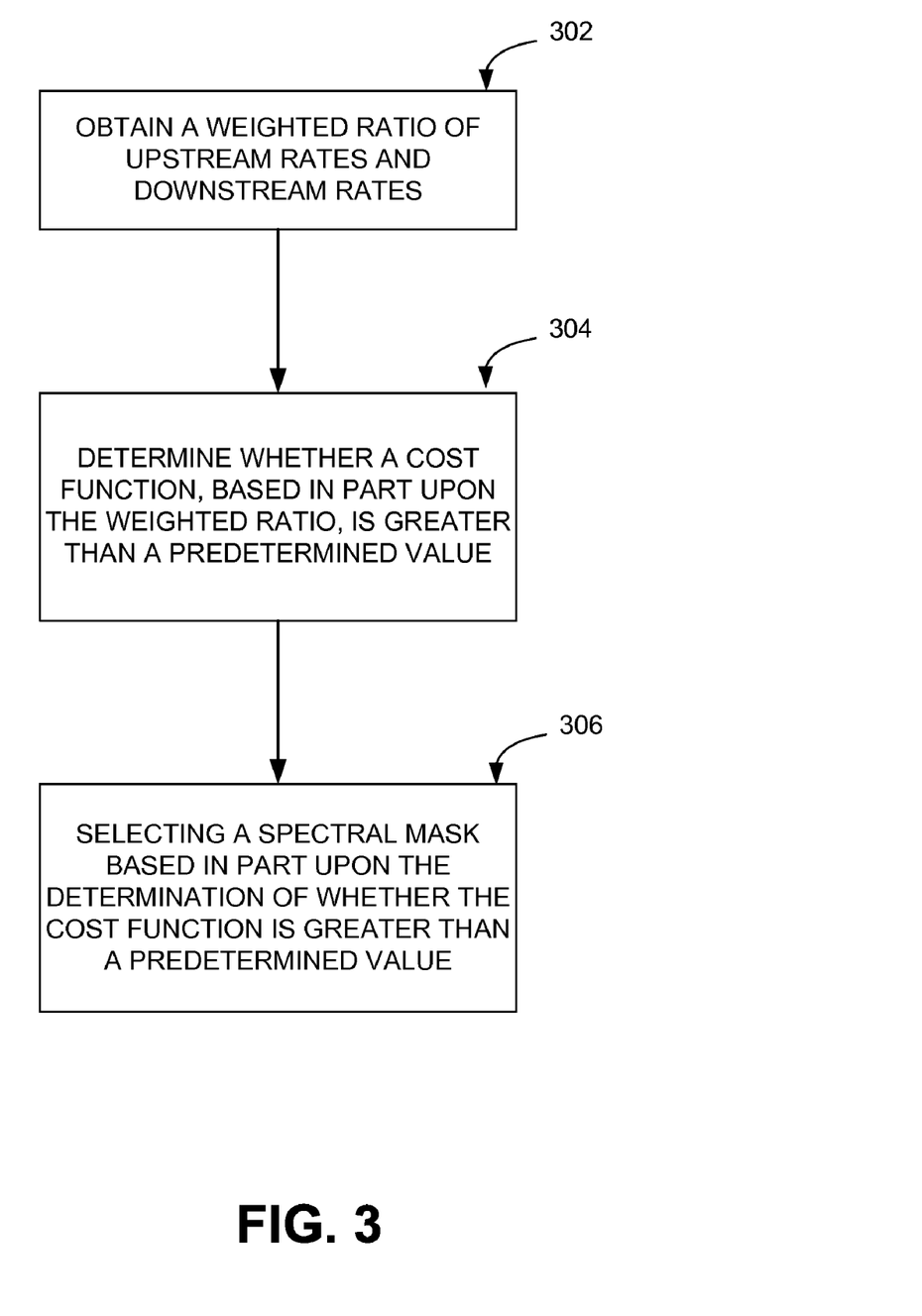
FIG. 3 is a flowchart illustrating the top-level operations of an embodiment of the invention.

Not surprisingly, the upstream data rate is reduced under some of the test cases. However, for the SHDSL, HDSL, T1, Reference is now made to FIG. 3, which is a flowchart illustrating the top-level operations of an embodiment of the invention. Specifically, FIG. 3 illustrates a method for selecting a spectral mask for use with a DSL system. The illustrated method comprises obtaining a weighted ratio of upstream rates and downstream rates 302. The method also determines whether a cost function, based in part upon the weighted ratio, is greater than a predetermined value 304. Finally, the method selects a spectral mask based in part upon the determination of whether the cost function is greater than a predetermined value 306.

Like Annex A, LDSL system operates in both non overlap and overlap modes. It should be pointed out that LDSL systems always meet the 96 kb/s upstream rate objective, against any loop/noise scenario defined in T1E1.4/2002-292R2, even in the presence of one LDSL overlap disturber.

The invention claimed is:

1. A DSL system comprising:
   mask selection criteria, the criteria comprising:
   a weighted ratio of upstream rates and downstream rates; and
   a cost function based in part upon the weighted ratio, wherein the cost function is defined according to the relation:

$$\text{cost function} = \left(2 \times \frac{\left(\frac{dsrate(2)-}{dsrate(1)}\right)}{dsrate(1)}\right) + \left(\frac{\left(\frac{usrate(2)-}{usrate(1)}\right)}{usrate(1)}\right),$$

wherein dsrate(1) is the downstream rate of a first mask, dsrate(2) is the downstream rate of a second mask, usrate(1) is the upstream rate of the first mask, and usrate(2) is the upstream rate of the second mask; and
   a mask-selectable operator configured to select a spectral mask based on the mask selection criteria, wherein the mask-selectable operator selects a spectral mask based in part upon a determination of whether the cost function is greater than a predetermined value.

2. The system of claim 1, wherein the predetermined value is zero.

3. The system of claim 1, wherein the predetermined value is zero and wherein, if the cost function is greater than zero, the second mask is selected.

4. The system of claim 1, wherein the upstream value of the first mask is given by the following relations:

for $0 \leq f < 4, U1 = -101.5$;

for $4 < f < 25.875, U1 = -96 + 23.4 \times \log_2(f/4)$;

for $25.875 \leq f < 60.375, U1 = -32.9$;

for $60.375 \leq f < 686, U1 = \max\{-32.9 - 95 \times \log_2$ $$\left(\frac{f}{60.38}\right),$$

$10 \times \log 10[0.05683 \times (f \times 10^3)^{-1.5}] - 3.5\}$;

for $686 \leq f < 1411, U = -103.5$;

for $1411 \leq f < 1630, U1 = -103.5$ peak, $-113.5$ average in any $[f, f+1$ MHz$]$ window;

and for $1630 \leq f < 12000, U1 = -103.5$ peak, $-115.5$ average in any $[f, f+1$ MHz$]$ window.

wherein f is frequency in kHz and U1 is measured in dBm/Hz.

5. The system of claim 1, wherein the downstream value of the first mask is given by the following relations:

for $0 \leq f < 4, D1 = -101$;

for $4 \leq f < 25.875, D1 = -96 + 20.79 \times \log_2(f/4)$;

for $25.875 \leq f < 91, D1 = -40$;

for $91 \leq f < 99.2, D1 = -44$;

for $99.2 \leq f < 138, D1 = -52$;

for $138 \leq f < 353.625, D1 = -40.2 + 0.0148 \times (f-138)$;

for $353.625 \leq f < 552, D1 = -37$;

for $552 \leq f < 1012, D1 = -37 - 36 \times \log_2$ $$\left(\frac{f}{552}\right);$$

for $1012 \leq f < 1800, D1 = -68.5$;

for $1800 \leq f < 2290, D1 = -68.5 - 72 \times \log_2$ $$\left(\frac{f}{1800}\right);$$

for $2290 \leq f < 3093, D1 = -93.500$;

for $3093 \leq f < 4545, D1 = -93.5$ peak, average$-40 - 36 \times \log_2$ $$\left(\frac{f}{1104}\right)$$

in any $[f, f+1$ MHz$]$ window; and for $4545 \leq f < 12000, D1 = -93.5$ peak, average$-113.500$ in any $[f, f+1$ MHz$]$ window, wherein f is frequency in kHz and D1 is measured in dBm/Hz.

6. The system of claim 1, wherein the upstream value of the second mask is given by the following relations:

for $0 \leq f < 4, U2 = -101.5$;

for $4 \leq f < 25.875, U2 = -96 + 21.5 \times \log_2(f/4)$;

for $25.875 \leq f < 103.5, U2 = -36.4$;

for $103.5 \leq f < 686, U2 = \max\{-36.3 - 95 \times \log_2$ $$\left(\frac{f}{103.5}\right),$$

$10 \times \log 10[0.05683 \times (f \times 10^3)^{-1.5}] - 3.5\}$;

for $686 \leq f < 1411, U2 = -103.5$;

for $1411 \leq f < 1630, U2 = -103.5$ peak, $-113.5$ average in any $[f, f+1$ MHz$]$ window;

and for $1630 \leq f < 12000, U2 = -103.5$ peak, $-115.5$ average in any $[f, f+1$ MHz$]$ window, wherein f is frequency in kHz and U2 is measured in dBm/Hz.

7. The system of claim 1, wherein the downstream value of the second mask is given by the following relations:

for $0 \leq f < 4, D2 = -101.5$;

for $4 \leq f < 80, D2 = -96 + 4.63 \times \log_2(f/4)$;

for $80 \leq f < 138, D2 = -76 + 36 \times \log_2\left(\dfrac{f}{80}\right)$;

for $138 \leq f < 276.000; D2 = -42.95 + 0.0214 * f$;

for $276 \leq f < 552.000; D2 = -37$;

for $552 \leq f < 1012, D2 = -37 - 36 \times \log_2\left(\dfrac{f}{552}\right)$;

for $1012 \leq f < 1800, D2 = -68.5$;

for $1800 \leq f \leq 2290, D2 = -68.5 - 72 \times \log_2\left(\dfrac{f}{1800}\right)$;

for $2290 \leq f < 3093, D2 = -93.5$;

for $3093 \leq f < 4545, D2 = -93.5$ peak, average $-40 - 36 \times \log_2\left(\dfrac{f}{1104}\right)$ in any $[f, f+1$ MHz$]$ window;

and for $4545 \leq f < 12000, D2 = -93.5$ peak, average $-113.500$ in any $[f, f+1$ MHz$]$ window, wherein f is frequency in kHz and D2 is measured in dBm/Hz.

8. A selectable mask system comprising:
mask selection criteria, the criteria comprising:
  a weighted ratio of upstream rates and downstream rates; and
  a cost function based in part upon the weighted ratio, wherein the cost function is defined according to the relation:

$$\text{cost function} = \left(2x \dfrac{(dsrate(2) - dsrate(1))}{dsrate(1)}\right) + \left(\dfrac{(usrate(2) - usrate(1))}{usrate(1)}\right),$$

wherein dsrate(1) is the downstream rate of a first mask, dsrate(2) is the downstream rate of a second mask, usrate(1) is the upstream rate of the first mask, and usrate(2) is the upstream rate of the second mask; and
a mask-selectable operator configured to select a spectral mask based on the mask selection criteria.

9. A selectable mask system comprising:
a plurality of predefined upstream spectral masks;
a plurality of predefined downstream spectral masks;
a mask-selectable operator configured to select a pair of spectral masks from the plurality of predefined upstream and downstream spectral masks based on:
  a weighted ratio of upstream rates and downstream rates; and
  a cost function based in part upon the weighted ratio, wherein the cost function is defined according to the relation:

$$\text{cost function} = \left(2x \dfrac{(dsrate(2) - dsrate(1))}{dsrate(1)}\right) + \left(\dfrac{(usrate(2) - usrate(1))}{usrate(1)}\right),$$

wherein dsrate(1) is the downstream rate of a first mask, dsrate(2) is the downstream rate of a second mask, usrate(1) is the upstream rate of the first mask, and usrate(2) is the upstream rate of the second mask.

\* \* \* \* \*